United States Patent [19]

Headrick et al.

[11] Patent Number: 5,724,358
[45] Date of Patent: Mar. 3, 1998

[54] HIGH SPEED PACKET-SWITCHED DIGITAL SWITCH AND METHOD

[75] Inventors: Kent H. Headrick, Newark; Kannan Devarajan, Sunnyvale, both of Calif.

[73] Assignee: Zeitnet, Inc., Santa Clara, Calif.

[21] Appl. No.: 606,163

[22] Filed: Feb. 23, 1996

[51] Int. Cl.[6] ............................................. H04L 12/56
[52] U.S. Cl. ................................. 370/418; 370/905
[58] Field of Search ............................. 370/230, 412, 370/413, 414, 417, 418, 429, 462, 902, 905; 395/474, 476, 478

[56] References Cited

U.S. PATENT DOCUMENTS

| | | | |
|---|---|---|---|
| 4,849,968 | 7/1989 | Turner | 370/232 |
| 5,014,265 | 5/1991 | Hahne et al. | 370/236 |
| 5,051,979 | 9/1991 | Chaudhuri et al. | 370/506 |
| 5,072,443 | 12/1991 | Hahne et al. | 370/440 |
| 5,115,430 | 5/1992 | Hahne et al. | 370/440 |
| 5,163,046 | 11/1992 | Hahne et al. et al. | 370/237 |
| 5,179,556 | 1/1993 | Turner | 370/233 |
| 5,191,578 | 3/1993 | Lee | 370/418 |
| 5,191,582 | 3/1993 | Upp | 370/392 |
| 5,229,991 | 7/1993 | Turner | 370/389 |
| 5,233,606 | 8/1993 | Pashan et al. | 370/418 |
| 5,278,828 | 1/1994 | Chao | 370/394 |
| 5,280,475 | 1/1994 | Yanagi et al. | 370/399 |
| 5,287,346 | 2/1994 | Bianchini, Jr. et al. | 370/390 |
| 5,287,530 | 2/1994 | Davis et al. | 370/390 |
| 5,291,477 | 3/1994 | Liew | 370/238 |
| 5,313,454 | 5/1994 | Bustini et al. | 370/231 |
| 5,317,562 | 5/1994 | Nardin et al. | 370/428 |
| 5,323,389 | 6/1994 | Bitz et al. | 370/397 |
| 5,331,641 | 7/1994 | Parruck et al. | 370/506 |
| 5,359,592 | 10/1994 | Corbalis et al. | 370/233 |
| 5,365,519 | 11/1994 | Kozaki et al. | 370/378 |
| 5,369,635 | 11/1994 | Gardini et al. | 370/389 |
| 5,394,397 | 2/1995 | Yanagi et al. | 370/390 |
| 5,402,415 | 3/1995 | Turner | 370/390 |
| 5,406,566 | 4/1995 | Obara | 371/21.2 |
| 5,410,540 | 4/1995 | Aiki et al. | 370/390 |
| 5,422,880 | 6/1995 | Heitkamp et al. | 370/352 |
| 5,430,715 | 7/1995 | Corbalis et al. | 370/392 |
| 5,436,893 | 7/1995 | Barnett | 370/392 |
| 5,438,566 | 8/1995 | Masetti et al. | 370/355 |
| 5,440,523 | 8/1995 | Joffe | 365/230.05 |
| 5,440,546 | 8/1995 | Bianchini et al. | 370/413 |
| 5,440,549 | 8/1995 | Min et al. | 370/394 |
| 5,457,679 | 10/1995 | Eng et al. | 370/395 |
| 5,459,724 | 10/1995 | Jeffrey et al. | 370/398 |
| 5,521,916 | 5/1996 | Choudhury et al. | 370/414 |
| 5,535,197 | 7/1996 | Cotton | 370/414 |

*Primary Examiner*—Benedict V. Safourek
*Attorney, Agent, or Firm*—Gray Cary Ware & Freidenrich

[57] ABSTRACT

A system and method for communicating multiple priority level data packets between input ports and output ports of a switch is disclosed where the data packet has a header portion identifying at least one output port destination and a level of priority, selected from a predetermined set of priority levels, of the data within the data packet. A buffer, shared by the output ports, stores the data packet in a selected buffer location based on the output port destination and priority level of the data packet. Pointers to buffer locations containing data packets having a particular priority level are stored in one or more priority sub-queues for one or more of the plurality of output ports based on the output port destinations and the priority level of the data packet. The data packets are output to the output ports in priority order.

32 Claims, 15 Drawing Sheets

HIGH SPEED PACKET-SWITCHED DIGITAL SWITCH AND METHOD

BACKGROUND OF THE INVENTION

This invention relates generally to high-speed packet-switched digital switches for communicating data, in the form of data packets. More particularly, the invention relates to high speed packet-switched digital switches for buffering and routing packets of data between a plurality of input ports and output ports of the switch.

High speed packet-switched switches for buffering and routing data packets between a plurality of input ports and output ports are well known. Typical of these are switches for buffering and routing data packets, such as in an asynchronous transfer mode (ATM) telecommunications network. In ATM communication networks, data packets are transferred in packets known as cells. These ATM cells may typically include voice data, live video data, computer data, and other types of electronic data. Regardless of the type of data, the ATM cell has a standard size and format that is employed for any type of electronic data so that all ATM cells are identical to the ATM communications system. A typical ATM switch buffers and routes ATM cells from any given input port to one or more output ports.

Present high speed digital packet-switched switches are typically required to handle large amounts of data packets, as well as handle the data packets efficiently that enter the switch from an input port, but are going to be broadcast (output) to more than one output port. This data traffic is known as multicast data traffic. As the amount of multicast traffic increases within a switch, the likelihood of the switch being inefficient increases. When too much multicast traffic enters a switch, the switch either blocks (delays) some of the multicast traffic or drops the multicast traffic and requires that the source of the multicast traffic retransmit the data. In addition, these switches are used for packet-switched systems, such as ethernet or ATM, and must handle traffic that has a priority level selected from a predetermined set of priority levels and even multiple priority level multicast traffic.

Some well known switches address the problem of handling the various types of data traffic by using a distributed type of system which uses a plurality of smaller switches connected together in a network. These distributed systems, however, do not provide a non-blocking architecture. In other words, even if there is a data packet going from an input port to an output port that is ready to accept the data packet, the data packet is being blocked due to the internal architecture of the switch. For these distributed systems, if two data packets both want to travel through the same smaller switch element, then one of the data packets will be delayed until the smaller switch is available. These distributed systems are also very expensive due to the plurality of smaller switches.

To reduce the cost of a packet-switched digital switch, shared memory architectures are used, in which a memory is shared by all of the output ports of the switch instead of having a separate memory for each output port. Although these shared memory switches are less expensive, they do not handle multiple priority level data traffic or multicast data traffic very well, in a non-blocking manner.

To improve the performance of these shared memory switches, a variety of different systems have been used. One shared memory switch has a separate queue for each output port that stores data packets being output to each output port. These switches do not handle multiple priority levels. In addition, these switches typically send out any multicast traffic to all of the output ports immediately. This method of sending out multicast traffic causes higher priority traffic to be delayed unacceptably.

The problems with current high speed packet-switched switches can be summarized. First, some current switches are too expensive, and cannot handle multicast and multiple priority level data traffic efficiently. Other current switches are inexpensive, but also can not handle multicast as well as multiple priority level data traffic.

Thus, there is a need for a high speed packet-switched digital switch and method which avoid these and other problems of known high speed packet-switched digital switches, and it is to this end that the invention is directed.

SUMMARY OF THE INVENTION

The invention provides a high speed packet-switched digital switch that has a switch with a shared memory architecture for reducing hardware costs. The switch may also have a memory controller that may include an output queue for each output port. Each output queue may further include a plurality of priority level sub-queues for efficiently routing data packets having different priority levels. The memory controller routes and buffers data packets on a per port, per priority level basis in order to reduce congestion within the switch and avoid unnecessary dropping of any data packets. The memory controller may also maximize the storage capacity of the memory by storing a single copy of the data packet, even for multi-cast data packets.

The invention also provides a high speed switch that processes low priority multi-cast data packets efficiently to reduce congestion and dropped cells and to decrease the delay of high priority data packets. In addition, the switch also provides a method of accepting or rejecting a data packet on a per port, per priority level basis in order to reduce congestion. The acceptance/rejection method also provides for the dynamic allocation of space within the memory to each output queue for each output port. The acceptance/rejection method also provides a minimum guaranteed memory space within the memory for each priority level sub-queue for each output port and also provides a limit for each priority level sub-queue. The invention further provides an ATM switch that is non-blocking for multicast cells so that multicast cells are not delayed within the switch.

A system for communicating multiple priority level data packets between an input and one or more output ports of a switch may have a system for receiving a data packet from the input port. The data packet may have a header portion indicating an output port destination and an output level of priority, selected from a predetermined set of priority levels, of the data packet. A buffer, shared by the output ports, may store the data packet in a selected buffer location, and a plurality of queues corresponding to each of the output ports store pointers to buffer locations containing data packets having different priority levels. The switch may also output the data packet an output port in priority level order. The switch may also output a data packet to more than one output port. A system and method for determining whether to accept a data packet into the buffer of the switch.

DETAILED DESCRIPTION OF A PREFERRED EMBODIMENT

The invention is generally applicable to a high speed packet-switched digital switch for buffering and routing large amounts of data packets at high speed, such as an asynchronous transfer mode (ATM) system. It is in this context that the invention will be described. It will be appreciated, however, that the system and method in accordance with the invention has greater utility.

Figure 1:
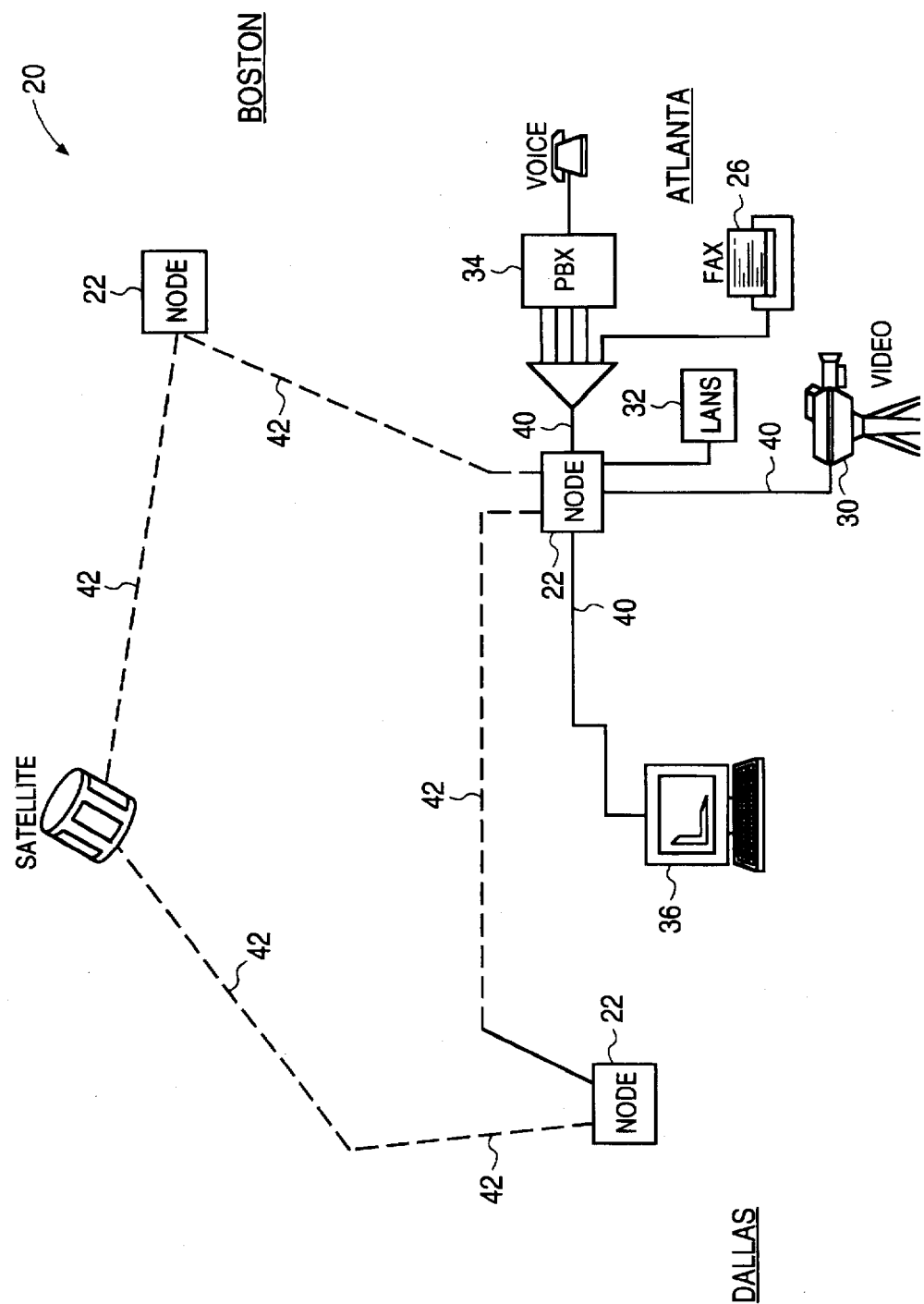
FIG. 1 is a block diagram of a wide area asynchronous transfer mode (ATM) communications system with which the invention may be employed.

FIG. 1 is a block diagram of a wide area communications network 20 in which a switch in accordance with the invention may be used. As shown, the wide area network may connect multiple cities in various geographic locations together, such as Dallas, Boston and Atlanta. The wide area communications system is made up of a plurality of nodes 22 connected together so that data may travel from one node to another. In particular, each node of a system may have a switch that accepts data from an input port, and outputs that data to one or more of a plurality of output ports, as described below. Thus, the switch is basically a switch that allows data packets to be routed from any of a plurality of input ports to any one or more of a plurality of output ports. The switch may also have traffic and congestion control systems and may have a system for buffering the data.

For example, the node in Atlanta receives data from various input sources, such as computer data from a server 36, facsimile transmissions from a facsimile machine 26, voice data from a public broadcast exchange (PBX) system 34 and video signals from a camera 30, and outputs that data to the wide area communications system. As shown, each node of the wide area communications system is connected by a communications link 42. Thus, data from a node in Boston may be transmitted to Dallas via a communications link from the Boston node to a satellite, and another communications link between the satellite and Dallas.

A switch, in accordance with the present invention, may also be used in local area networks to connect a plurality of desktop computers, servers and workstations together. In a local area network system, the distance between the nodes may be smaller, but the same routing of data packets occurs.

Figure 2:
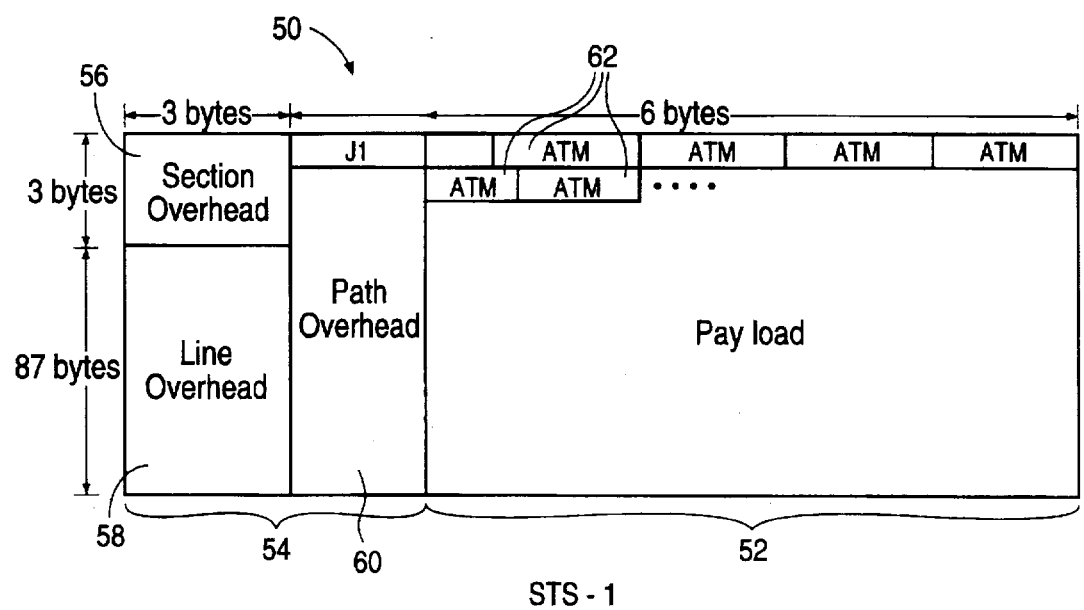
FIG. 2 is a schematic diagram of a data packet that may be communicated over the ATM communications system of FIG. 1.

FIG. 2 is a schematic diagram of an STS-1 synchronized packet envelope 50 that may be communicated over the wide area communication system, shown in FIG. 1. The STS-1 frame 50 consists of two parts: a synchronous payload envelope 52 and transport overhead 54. The synchronized payload envelope 52 is the part of the signal that can be structured to efficiently carry user data, broken down into individual ATM cells 62, as described below, of various bit rates and formats so that many different types of signals can be carried by the STS-1 synchronized packet envelope.

Figure 3:
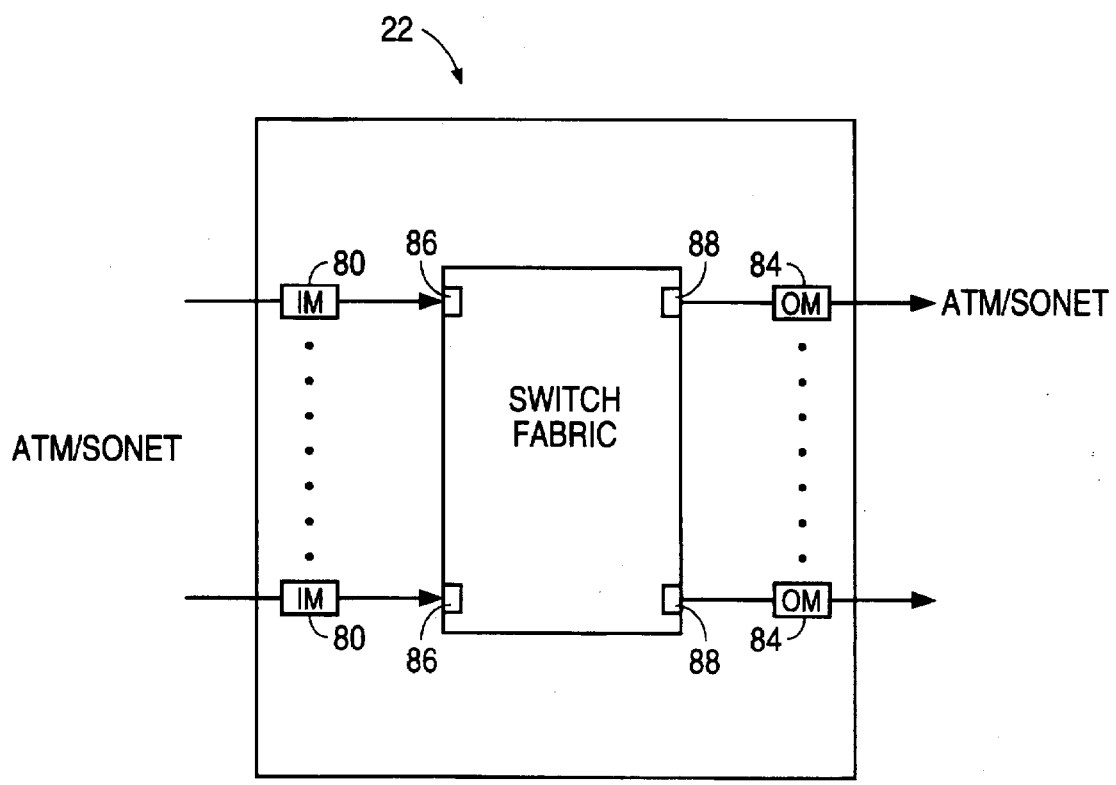
FIG. 3 is a block diagram of a node of the ATM communications system shown in FIG. 1.

FIG. 3 is a block diagram of a node 22, as shown in FIG. 1. The node 22 may include a plurality of input modules 80, a switch fabric 82 and a plurality of output modules 84. The input modules convert the STS-1 signals, as shown in FIG. 2, and break them down into individual ATM cells using the information in the transport overhead. The node 22 may also be used in an ethernet packet-switched system or any other high speed packet-switched system. As shown, there are a plurality of input modules that transmit data into the switch fabric. Typically, the switch fabric may have sixteen input ports 86, but is not limited to any particular number of input ports. The switch fabric, in accordance with the invention, processes a variety of incoming data packets, such as ATM cells, from the input modules, stores the data packet in a memory, and determines the appropriate routing of a particular data packet through the switch to an appropriate output port 88. In addition, the switch fabric may also buffer the incoming data packets, such as ATM cells, in order to equalize the speed of the incoming port and of the outgoing port. For example, if data is entering the switch fabric at 155 Mbps, and the output port is transmitting is 25 Mbps, then the cells must be buffered within the switch fabric in order equalize the speeds of the ports. The operation of the switch fabric, in accordance with the invention, for buffering and routing a variety of data packets, including ATM multiple priority level cells and multicast cells, will be described in more detail below. Once the switch fabric has routed and buffered the incoming data packets from the input modules to the output ports of the switch fabric, these data packets, such as ATM cells, are transmitted out the output modules 84 and back out onto the wide area or local area communications network. For an ATM network, the outgoing modules may convert the data packets back into aggregate signals, such as the STS-1 synchronized packet envelope. As with the input ports, each output port of the switch fabric has an output module 84 that converts the signals back into the STS-1 format. To better understand the operation of the switch fabric, the format of one type of ATM cell will be described.

Figure 4:
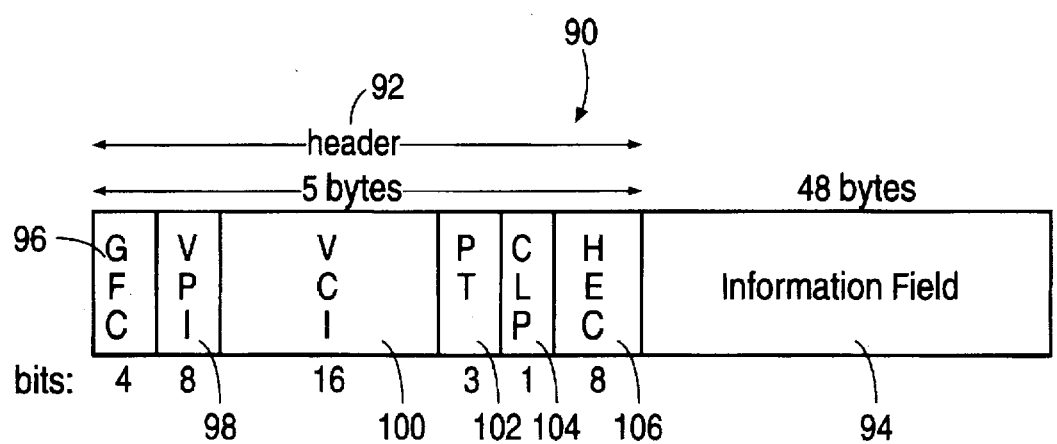
FIG. 4 is a schematic diagram showing a typical ATM cell that may be routed and buffered by the ATM node shown in FIG. 3.

FIG. 4 is a schematic diagram of a standard ATM cell 90 that has a user-network interface (UNI) format. The ATM cell may also have a network-node interface (NNI) format. This is similar to the UNI format shown, and will not be described. The ATM cell is 53 bytes long and includes a header portion 92 and an information field portion 94. The header portion is 5 bytes long, and the information field portion is 48 bytes long.

The header portion 92 includes a plurality of control signals that includes information about the routing of the ATM cell and a priority level of the ATM cell. The header for the UNI format, as shown, may include a generic flow control (GFC) field 96, a virtual path identifier (VPI) field 98, a virtual channel identifier (VCI) field 100, a payload type (PT) field 102, a cell loss priority (CLP) field 104, and a header error control (HEC) field 106. The GFC field 96 is four (4) bits wide and provides a mechanism for controlling the flow of multiple user terminals connected to a shared access link. The GFC field is generally not used. The VPI field 98 is eight (8) bits wide, and identifies the virtual path of the data in the information field. The VCI field 100 is sixteen (16) bits wide and identifies the virtual channel of the data within the information field. The combination of the VCI field and the VPI field keep track of the routing path of the ATM cell through the ATM communications system, so it may be determined where the cell is going. The VPI and VCI fields are assigned to the data at each connection and can be changed. The PT field 102 is three (3) bits wide, and distinguishes between cells containing user data and network information. For example, when the network is sending congestion control information between nodes, the PT field would specify that it was network information. The CLP field is 1 bit wide and allows a two-level loss priority to be specified explicitly for individual cells. This CLP field is used so that low loss priority cells within the switch fabric will be discarded before cells of high loss priority if congestion occurs. Finally, the HEC field 106 is eight (8) bits wide and stores cyclic redundancy check data for error protection of the cell header. The information field of the ATM cell is not protected against errors in the switch fabric. The information field 94, as described above, contains the data within each ATM cell, and is 384 bits (48 bytes) long. Although an ATM cell format is being described, the high speed packet-switched digital switch of the invention may also be used with an ethernet system that has slightly different data packet formats. Now, the architecture of a high speed packet-switched digital switch in accordance with the invention will be described.

Figure 5:
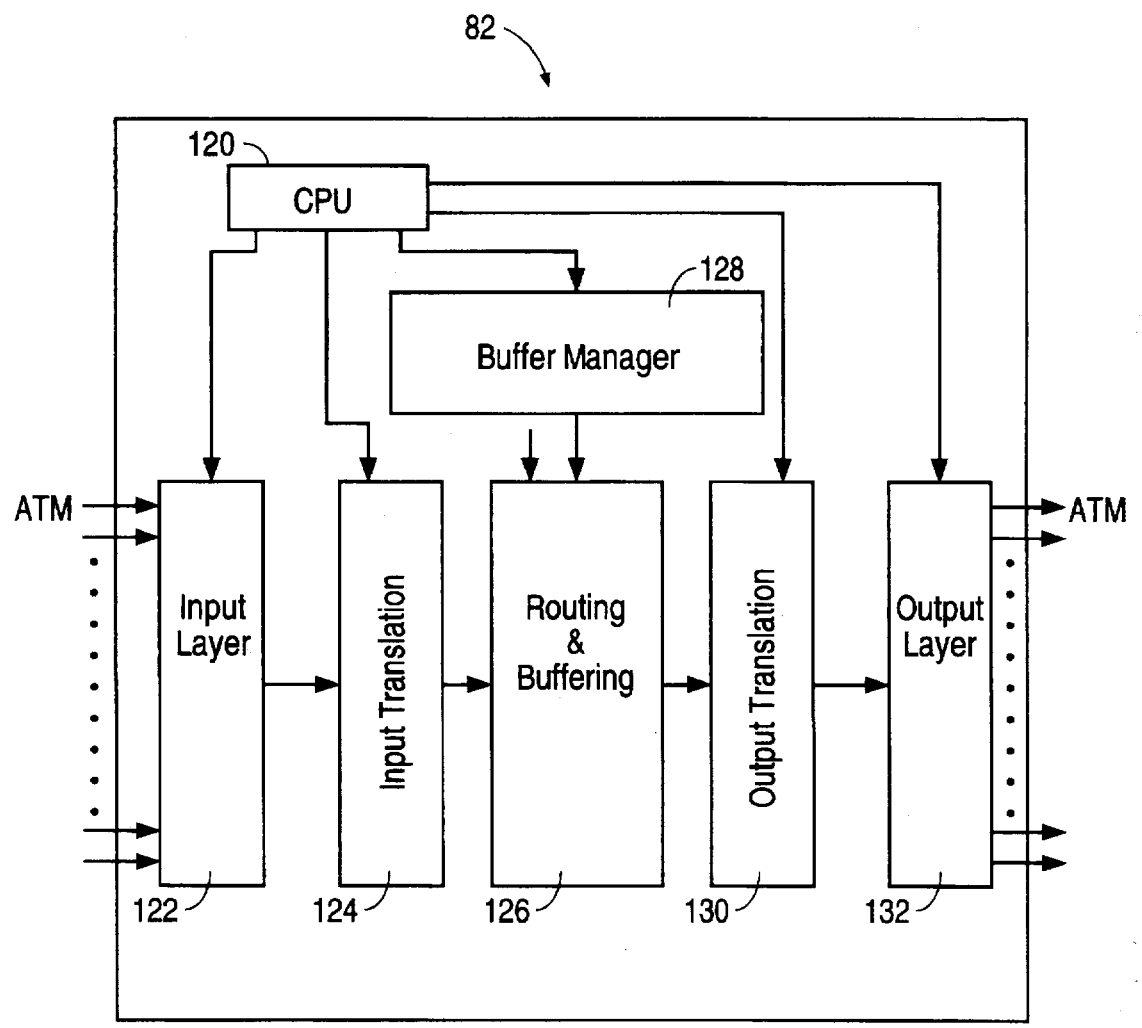
FIG. 5 is a block diagram of the ATM node shown in FIG. 3.

FIG. 5 is a block diagram of a switch fabric 82 in accordance with the invention. The switch fabric is described in the context of an ATM network, but may also be used in any other type of high speed packet-switched digital communications system, such as ethernet. The switch fabric may include a central processing unit (CPU) 120 for controlling the various functions and operations within the switch fabric. In particular, the CPU initializes various systems of the switch fabric. As shown, the CPU may be connected to the various systems within the switch fabric, such as an input layer 122, an input translation system 124, a routing and buffering unit 126, a buffer manager 128, an output translation system 130, and an output layer 132. Generally, the switch fabric processes various types of data packets quickly and efficiently. Each of these traits will be described in more detail below.

The input layer 122 may receive data, such as ATM cells, in a serial fashion from the input ports and convert them into an internal parallel data signal, known as Utopia level 2. Once the ATM cells are converted by the input layer 122 into the internal format, they are fed to an input translation system 124. The input translation system disassembles the ATM cells into two parts. In particular, the input translation system separates the ATM cell into a header portion and a data portion. The input translation system also generates an internal header tag, as described below, that may be attached to the data in order to track and route the data as required. The input translation unit outputs an internal tag signal and a data signal to the routing and buffering unit 126.

The routing and buffering unit 126 stores the data and internal tag together in a memory or buffer, as described below, and may be controlled by the buffer manager 128. The buffer manager also keeps track of the one or more output ports that the cell is destined for, and of the priority level of the ATM cell, based on the internal tag, as described below. The structure and operation of the routing and buffering unit and the buffer manager will be described below in more detail with reference to FIG. 7. When it is time to output an ATM cell to one or more of the output ports, the buffer manager 128 decides, in a round robin fashion, which output port is going to receive data. The data to be output to that output port selected is then read out of the routing and buffering unit 126 into the output translation system 130. The output translation system 130 reassembles the ATM cell based upon the data and internal tag from the routing and buffering unit 126. Once the ATM cell has been reassembled in the output translation system 130, it is sent to the output layer 132, that converts the parallel signal (Utopia Level 2) back into the serial format. Thus, the switch fabric 82 receives an ATM cell having a selected priority level at one of the plurality of input ports, stores the ATM cell, and routes that ATM cell to one or more of the output ports. Typically, a switch fabric may have 16 input ports and 16 output ports, but that number may vary and the switch in accordance with the invention may be easily expanded to accommodate more input ports and more output ports.

Figure 6:
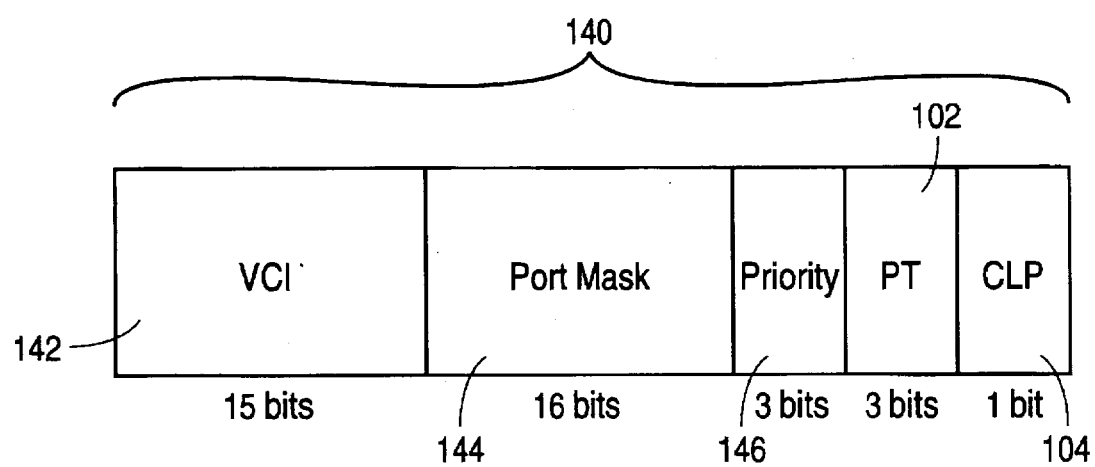
FIG. 6 is a schematic diagram of an internal tag that may be generated by the ATM node shown in FIG. 5.

FIG. 6 is a schematic diagram of an internal tag 140 that may be created by the input translation system. The internal tag 140 is created from the header portion of the ATM cell. The internal tag may include a routing tag 142, a port mask field 144 and a priority field 146. The internal tag may also include the PT field 102 and CLP field 104 from the header portion of the ATM cell. The routing tag field 142 is 15 bits wide and contains information about the routing of an ATM cell through the switch fabric. The port mask 144 is 16 bits wide and specifies the output port/ports to which the ATM cell is destined. The port mask is used by the memory manager to route the cell correctly and is then discarded. The priority field 146 is 3 bits wide and stores information relating to a priority level of the ATM cell selected from a plurality of predetermined priority levels. The number of priority levels depends on the network that the switch is being used with. The priority level of the ATM cell is determined when a virtual connection through the ATM switch is set up and may be done by software in the CPU.

The internal tag is a compressed version of the ATM cell header portion since the port mask field is dropped at the memory manager. Thus, only 3 bytes of the internal header need to be stored in the routing and buffering unit because the port mask field is dropped. The priority field may be three bits wide. The first two bits are used to indicate four different predetermined priority levels. Extra bits may be added to the priority field if additional priority levels are required. The last bit of the priority field stores a loss sensitivity bit. For example, computer data, that cannot lose arbitrary parts of the data, is loss sensitive and has this bit set. On the other hand, voice data is still useable even if some of the data is lost, so voice data is loss insensitive and the loss sensitive bit is not set.

Figure 7:
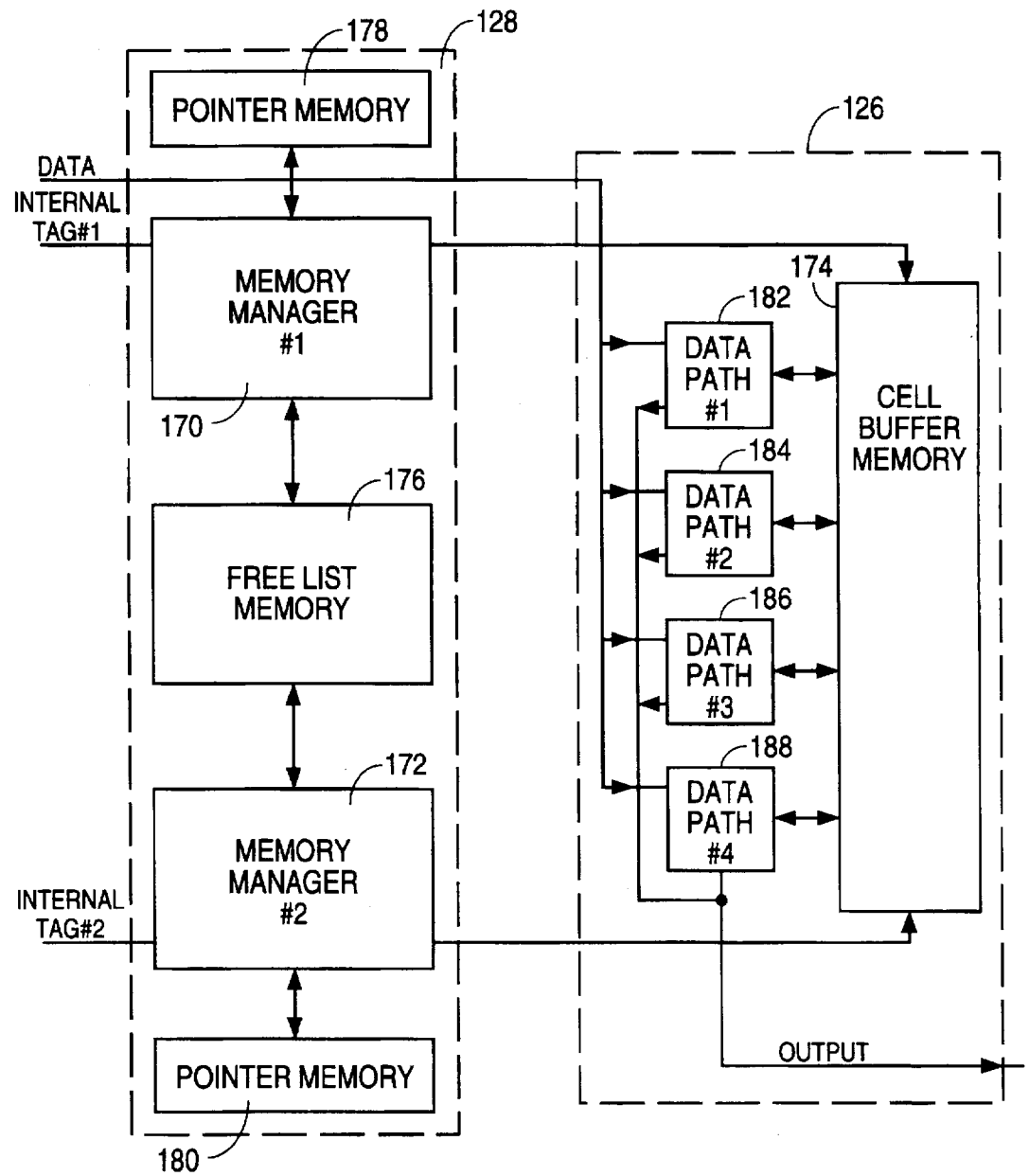
FIG. 7 is a block diagram of the routing and buffering unit and the buffer manager of the switch of FIG. 5.

FIG. 7 is a block diagram of the routing and buffering unit 126 and the buffer manager 128, in accordance with the invention. As described above, these two sub-systems route, buffer, and keep track of multiple priority level data packets as well as multicast data packets. The internal tag, as described above, from the input translation unit 124, is fed into a first memory manager 170 and a second memory manager 172. The first memory manager may process incoming ATM cells for ports 0-7, and the second memory manager may process incoming ATM cells for ports 8-15. The number of memory managers may be increased or decreased depending on the number of input ports for the particular switch. The first and second memory managers 170, 172 control a cell buffer memory 174 that is located within the routing and buffering unit 126. The cell buffer memory is organized as a plurality of addressable memory locations. These memory locations within the cell buffer memory are controlled by the memory managers which allocate free memory locations within the cell buffer memory using a freelist memory 176.

The freelist memory may store a plurality of pointers linked together to form a linked list, linking all free locations in the cell buffer memory together so that a list of every free memory location is available. A head pointer of the freelist points to the first available memory location within the cell buffer memory, and a tail pointer points to the last memory location. Thus, there is a linked list, using pointers in the freelist memory that stores all of the free memory locations. This freelist memory and the linked list allow noncontiguous parts of the memory to be available and to be accessible by the memory managers.

Each memory manager 170, 172 also has a pointer memory unit 178, 180, respectively, that is associated with it. Each output port has a separate pointer memory associated with it so that each of the pointer memories may be updated simultaneously, as described below. Each pointer memory stores a plurality of pointers that are used to keep track of the various cells within cell buffer memory. In particular, each output port in the switch has a linked list in a pointer memory that forms an output queue for that output port so that the order that data packets are going to sent out the port is known. The details of the pointer memories and the output queues will be described below, in more detail, with reference to FIG. 10.

The DATA signal from the input translation unit 126 is fed into a first data path unit 182, a second data path unit 184, a third data path unit 186, and a fourth data path unit 188. These data path units split up the 48 byte wide data (384 bits), into smaller pieces, and feeds them into the cell buffer memory. The data path units also read data out of the cell buffer memory and the associated internal tag, and send it out as an OUTPUT signal to the output translation unit, as described above. Now, the operation of the switch, in accordance with the invention, will be described with reference to FIGS. 8 and 9.

Figure 8:
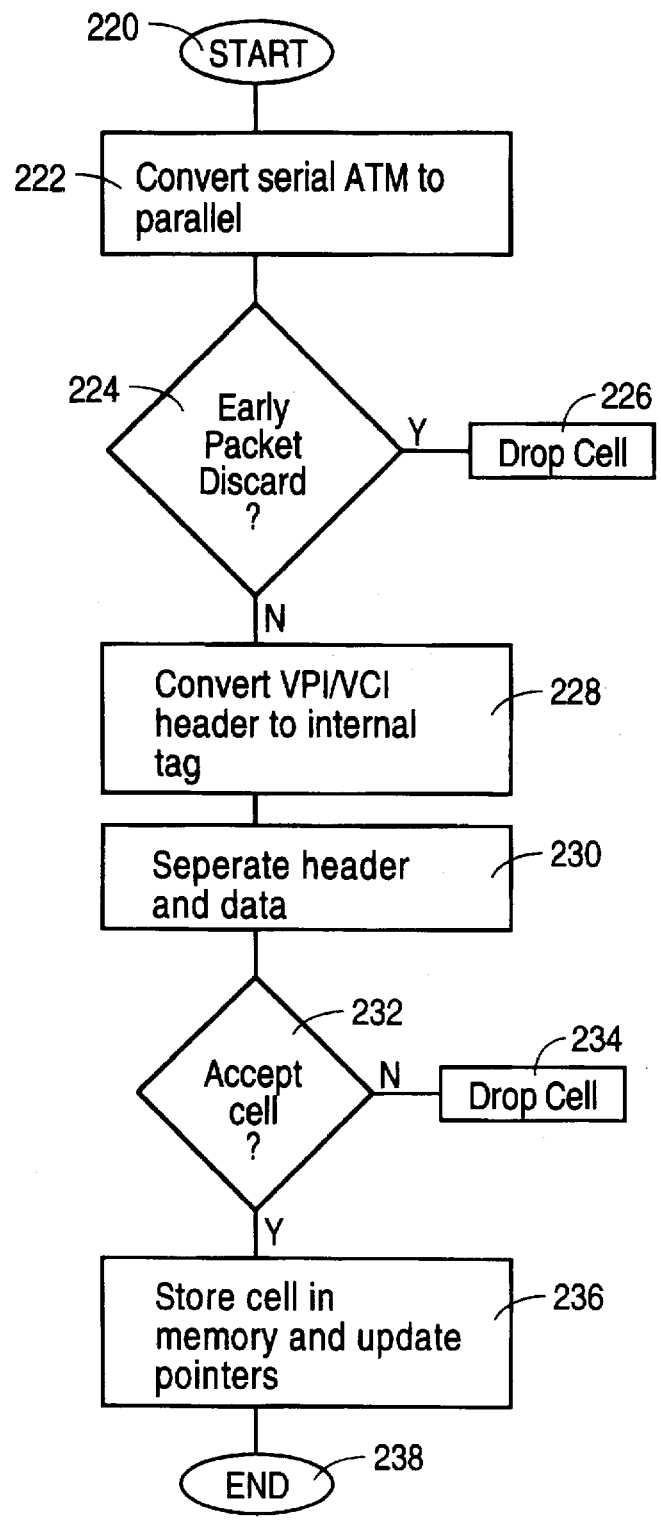
FIG. 8 is a flowchart showing a method of routing and buffering an ATM cell, in accordance with the invention, that may be carried out by the ATM communications system.

FIG. 8 is a flowchart of a method, in accordance with the invention, for processing an incoming ATM cell using the ATM switch, described above. The method begins in Step 220. In Step 222, the incoming ATM cell is converted from a serial format to a parallel format in the input physical layer. Then in Step 223, the ATM cell header portion is converted into an internal tag. Next, in Step 224, it is determined whether or not an early packet discard must be conducted. The early packet discard is a way of discarding entire packets of data, containing multiple ATM cells, if any one of those cells within the packet has already been dropped. The early packet discard method is particularly useful for computer data that is loss sensitive. The early packet discard method prevents the ATM switch from wasting cell buffer memory space on ATM cells that must be retransmitted anyway. If any early packet discard is required, then in Step 226, the incoming cell is dropped. Next in Step 230, the ATM cell is separated into the internal tag and a data portion. Next in Step 232, it is determined whether or not the cell will be accepted by the cell buffer memory. The details of the cell acceptance method, in accordance with the invention, will be described in more detail below. If the cell is not accepted, then the cell is dropped in Step 234. On the other hand, if the cell is accepted into the cell buffer memory, then, in Step 236, the cell is stored in the memory and the pointers in the pointer memories are updated. The details of the storing of the cell in the memory and the updating of the pointers will be described in more detail below. The method is ended in Step 238.

Figure 9:
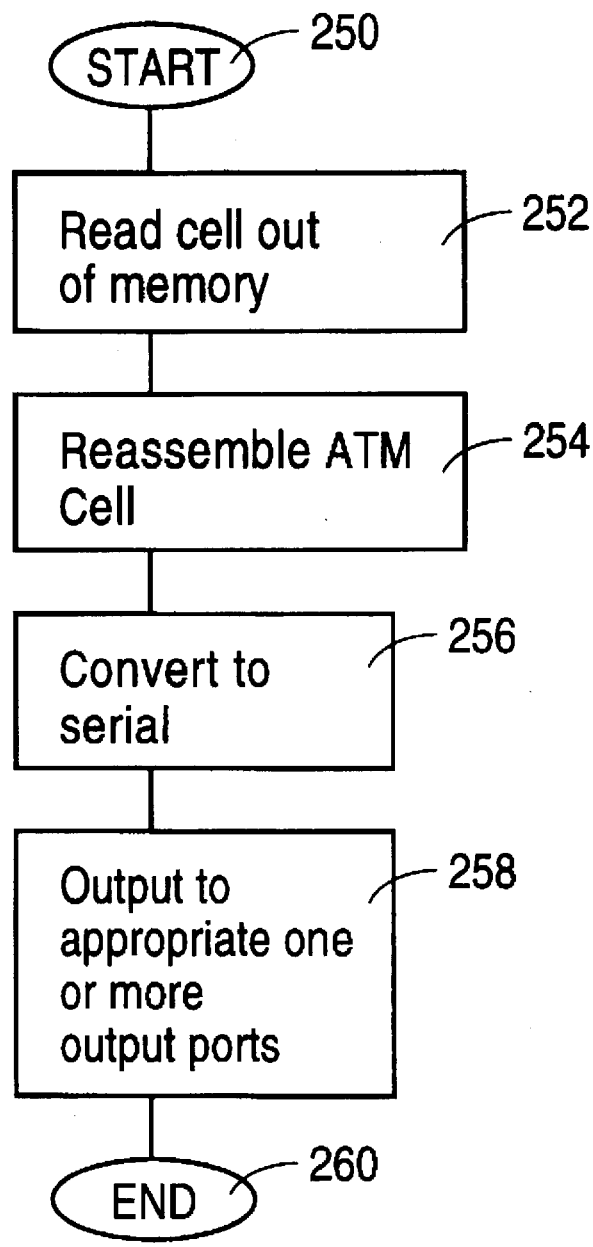
FIG. 9 is a flowchart showing a method of outputting an ATM cell, in accordance with the invention, that may be carried out by the ATM communications system.

FIG. 9 is a method in accordance with the invention of outputting a cell within the switch to one or more output ports. In Step 250, the method is started. In Step 252, the cell is transferred out of the cell buffer memory based on control signals from the memory manager. Next, in Step 254, the ATM cell is reassembled from the data in the cell buffer memory and the internal tag. A lookup memory is used to look up the header corresponding to internal tag, and to regenerate the ATM cell header portion. Once the ATM cell is reassembled into a 53 byte cell, in Step 256, it is converted back into a serial ATM cell. Next, in Step 258, the serial ATM cell is output to one or more of the output ports, as determined by the original VPI/VCI fields in the ATM cell header. The method is ended in Step 260. Now, the details of the cell buffer memory, the freelist memory, and the pointer memory will be described with reference to FIG. 10.

Figure 10:
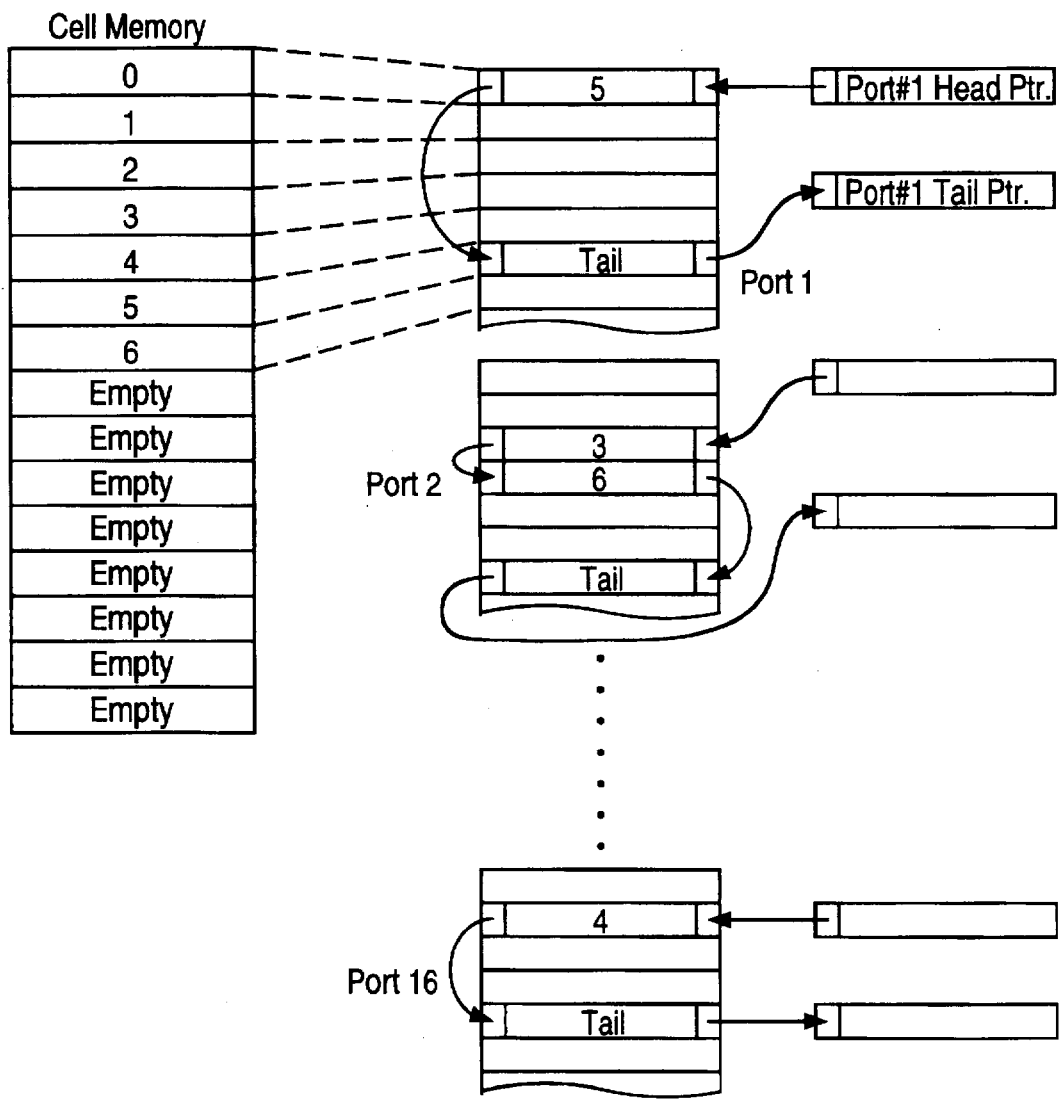
FIG. 10 is a block diagram showing the operation of the buffering and routing unit and buffer manager of FIG. 7.

FIG. 10 is a block diagram in which the cell buffer memory 174, the freelist memory 176, and the pointer memories 178, 180 are shown. Each memory location 280 of the cell buffer memory stores one half of an ATM cell. The cell buffer memory may also store a full ATM cell For clarity, the memory locations 280 are shown, as being a full 48 bytes wide. As shown, memory locations zero to six are filled with data. For simplicity, the cell data in the memory location is referred to by the memory location. In addition, locations seven to fourteen are empty. Thus, a head pointer 282 in the freelist memory points to the first empty location in the memory, which is location seven. Similarly, a tail pointer 284 of the freelist memory points to empty location number fourteen. The freelist is a linked list structure and can have a plurality of pointers so that the cell buffer memory may have noncontiguous empty cells that may be used. This permits dynamic allocation of the cell buffer memory. As shown in FIG. 10, the linked list would contain location seven that points to location eight, and so on. For a cell buffer memory, for example, with free locations at locations 1, 2, 4, 7, 9, the freelist would be a linked list with a head pointer pointing to location 1, that in turn points to location 2 that points to location 4 and so on.

The freelist pointers are updated whenever an ATM cell is no longer needed by any output port of the switch. In other words, when an ATM cell is output for a unicast cell (an ATM cell going to only one output port), the memory location containing the ATM cell is put back into the freelist linked list, but the memory location is actually not overwritten until that memory location is used again. For a multi-cast ATM cell (an ATM cell bound for more than one output port), the memory location containing the multi-cast ATM cell is not added back into the freelist linked list until after that ATM cell has been output to all of the output ports.

The pointer memories 178, 180 contain a plurality of linked list type data structures that are the output queues for the plurality of output ports. In this embodiment, a 16 output port ATM switch is described so there are 16 linked list output queues stored in the pointer memories 178, 180. In particular, the output queues for ports 0 through 7 are stored in pointer memory 178, and the output queues for ports 8 through 15 are stored in pointer memory 180. A representative output queue for port one 286, an output queue for port two 288, and an output queue for port sixteen 290 are shown. The detailed structure of the output queue for port one 286, will be described in more detail below. The other output queues have a similar structure as will not be described in any more detail.

Each entry within the output queue may have a next memory location field 294. Each element of every output queue is mapped to a corresponding memory location. The mapping for the output queue only is shown, for clarity. Thus, if the cell buffer memory has 16,000 memory locations, then each output queue for each output port will also have 16,000 elements. This one-to-one mapping of the cell buffer memory locations and the pointer elements permit the ATM switch, in accordance with the invention, to handle multi-cast ATM cells in an efficient way, as described below with reference to FIG. 1. For example, the port one output queue has cell buffer memory locations zero and five of the output queue. To link the two elements of output queue together, the next memory location field 294 contains the next element in the output queue (five, in the example), and a pointer points to the fifth output queue element. Since memory location five is the last location in the output queue, the next memory location field is unused and a tail pointer for port one 300 points to the fifth output queue element that corresponds to the fifth memory location. Similar, for port two, the output queue has cells 2, 3, and 6 so the next memory location field of element two contains the next element (three, here) and the address field of element three contains the next element (six, here). This is how the linked list output queue structure is formed.

In addition, the output queue for port one 286 also has a head pointer 298 that points to the first entry in the output queue for port one. The output queue also has a tail pointer 300 that points to the end of the output queue. These head and tail pointers of the output queue are used to keep track of the length of the queue, as well as the position of the last and first elements. The head and tail pointers for all of the output queues may be stored in registers on a VLSI implementation of the invention, or in a memory. The output queues shown in FIG. 10 has a single priority level, but a preferred switch in accordance with the invention may have a plurality of priority levels, as shown in FIG. 11.

Figure 11:
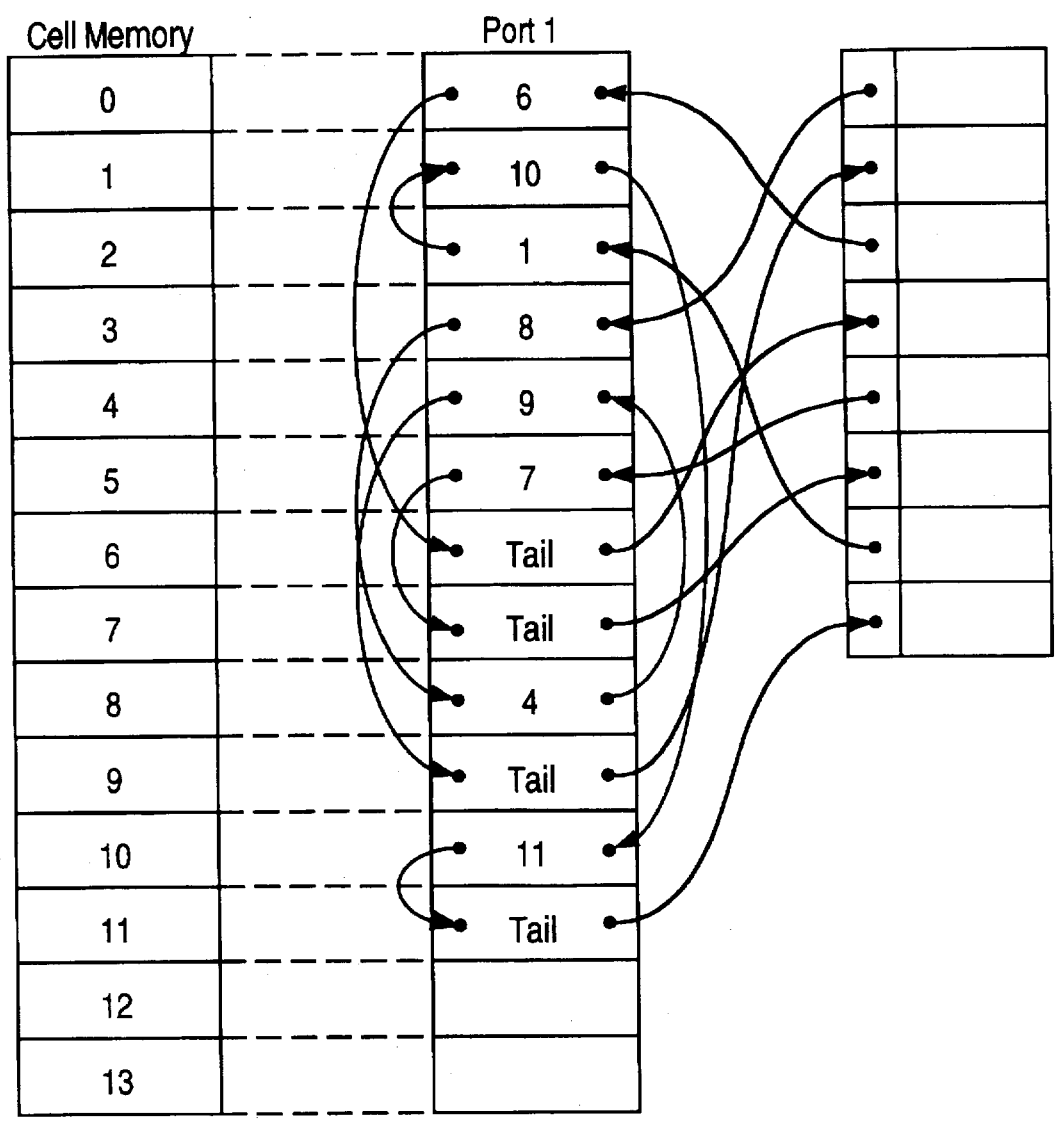
FIG. 11 is a block diagram showing a multiple priority level output queue and the associated pointer memory for an output port.

FIG. 11 is a more detailed block diagram of the output queue 286 of Port 1 as well as a pointer memory 320 for Port 1 with multiple priority levels. As above, each cell buffer memory location is mapped directly to each output queue element. The output queue 286 for Port 1 has a pointer memory 320 associated with it. The combination of the output queue and the pointer memory permits the switch, in accordance with the invention, to have a plurality of priority levels of the data within the switch. This plurality of priority levels allows the switch, in accordance with the invention, to efficiently route and buffer multicast cells, as described below. For multiple priority levels, a plurality of priority sub-queues may be present within the overall output queue for each port. A head pointer for the first level of priority 322 points to the head of the high priority output sub-queue. In this drawing, at the head of the high priority sub-queue is memory location/element three. The next memory location is eight so the next memory location field of element three contains eight, and a pointer of the entry 3 in turn points to the next location in the sub-queue, that is, location 8 in this example. Similarly, element eight points to element 4 which points to element nine that has an unused next memory location in the next memory location field and is pointed to by a high priority tail pointer 324. Thus, there is a linked list for the high priority sub-queue of port 1 that has entries 3, 8, 4, and 9 in it. Similarly, a second priority head pointer 326 points to the head of the second priority output sub-queue which contains memory location 0. Memory location 0 then points to memory location 6, which is the end of this second priority output sub-queue. Thus, a second priority tail pointer 328 points to element six. A third priority head pointer 330 points to the beginning of the third priority output sub-queue, which includes entries 5 and 7. A third priority tail pointer 332 points to element 7. A low priority head pointer 334 points to the head of low priority output queue, which includes entries 2, 1, 10 and 11. A low priority tail header 336 points to element 11, which is the end of the low priority output sub-queue. Thus, within the linked list output queue for port 1 286, there are a plurality of priority sub-queue which keep all of the various priority data separate. The head and tail pointers within the pointer memory 320 are dynamically reallocable. Thus, cells are read in and read out of each priority sub-queue, the header and tail pointers are updated. Briefly, in operation, the multiple priority sub-queues ensure that all high priority data for a particular port is sent out before any second priority data, and so on.

Figure 12:
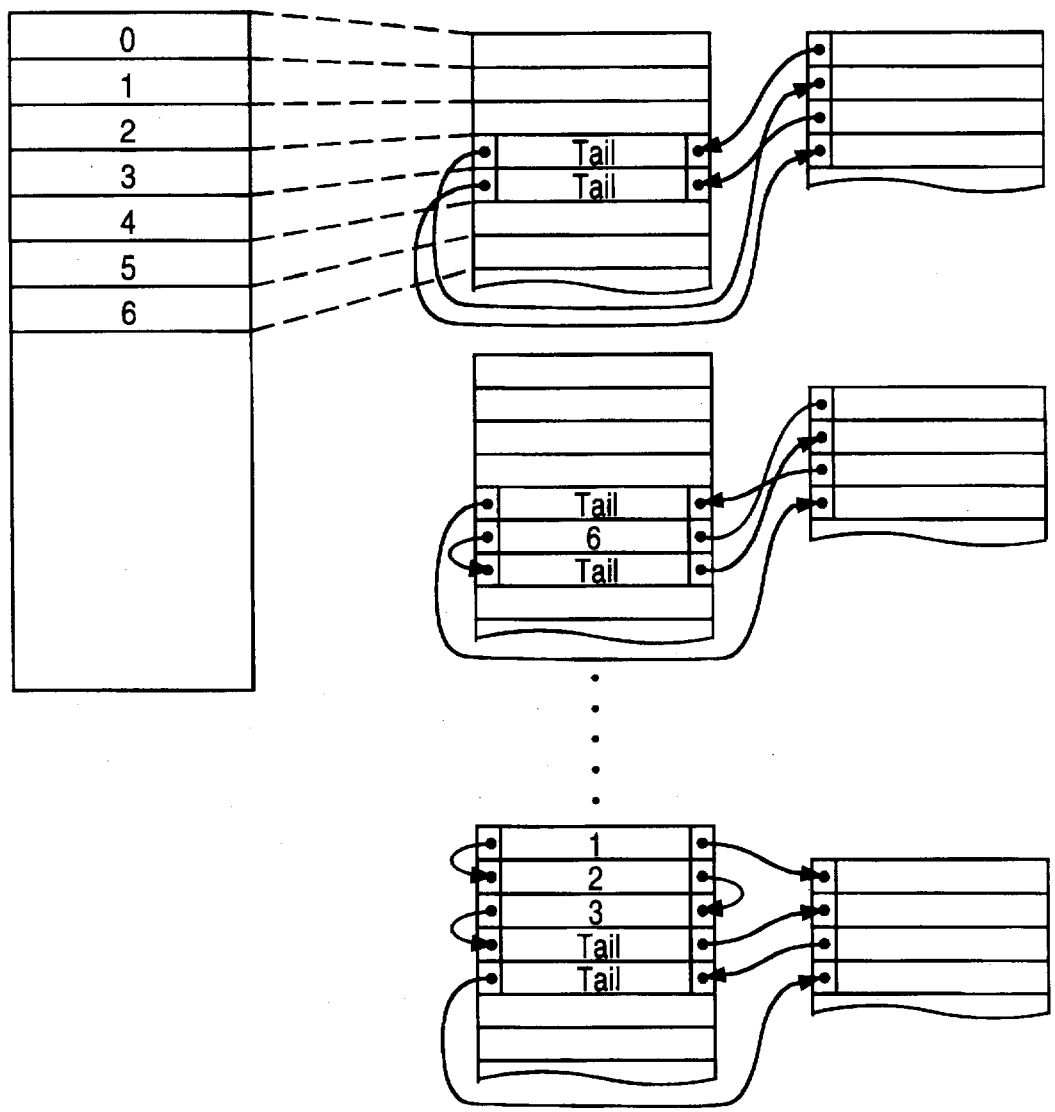
FIG. 12 is a block diagram showing the processing of a low priority multi-cast ATM cell in accordance with the invention.

FIG. 12 is a block diagram showing how a low priority multicast ATM cell is handled within the ATM switch of the present invention. As described above, the cell buffer memory 174 has a plurality of output queues associated with it. In this drawing, the Port 1 output queue 286 and the Port 1 pointer memory 320, a port two output queue 354, and a port two pointer memory 356 and a port sixteen output queue 362, and an associated port sixteen pointer memory 364 are shown.

To efficiently handle multi-cast call traffic, a truly non-blocking ATM switch architecture is needed. A non-blocking ATM switch means that if there is available bandwidth at a particular output port and cells to be output to that particular output port they are transmitted without significant delay. The ATM switch of the invention is non-blocking for multi-cast traffic. In the present switch, groups of the pointer memories for some of the output ports may be stored together, but not all pointers are stored in the same memory. This separation of the physical location of the pointers permits the pointers for every output port to be simultaneously updated in a single cell time. This simultaneous update of the pointers makes the ATM switch truly non-blocking for multi-cast traffic. For example, even for a multi-cast cell being broadcast to all the output ports, the pointers for all the output ports are updated with the new multi-cast cell simultaneously so no delay occurs. In addition, the simultaneous update of each of the pointers also permits any amounts of multicast traffic to be handled.

In this drawing, ATM cells 0, 1, 2, and 3 within the cell buffer memory are unicast cells. As described above, unicast cell is a cell that goes from a single input port to a single output port. By contrast, cell 4 is a multicast cell which goes from a single input port, but is then broadcast and output to more than one of the output ports.

As shown, cell 4 is a low priority multicast cell that is destined for ports one, two and sixteen. Even though cell 4 is being output to multiple output ports, a single copy of the data for cell 4 is in the all buffer memory and each output queue has a pointer to the memory location. Thus, cell 4 is contained within the output queues for ports one, two, and sixteen. This multicast cell has a low priority. Thus, within each ports output queue, a pointer to cell 4 is put into the low priority output sub-queue. Thus, for Port 1, cell 3 is read out prior to cell 4 due to the fact that cell 3 is of a higher priority. In port 2, cells 5 and 6 are in the high priority sub-queue and are read out before cell 4 for the same reason. In port sixteen, cells 0, 1, 2, 3 are in the high priority sub-queue and are output before the multicast cell 4.

In this system, a low priority multicast cell may never preempt a higher priority cell. In other conventional ATM switches, a low priority multicast cell is sent out over all of the output ports immediately, thus preempting some high priority traffic. As described above, the ATM switch of the invention, has avoided this problem by using a multiple priority linked list structure for multicast traffic. Thus, the ATM switch of the invention, can track and route four (4) different priority levels of data efficiently. The number of priority levels is not limited to the one shown in the embodiments, but may be any number of priority levels. As described above, the internal tag can support four priority levels without any modification. Any additional priority levels requires additional pointer registers, but not additional pointer memory.

Figure 13:
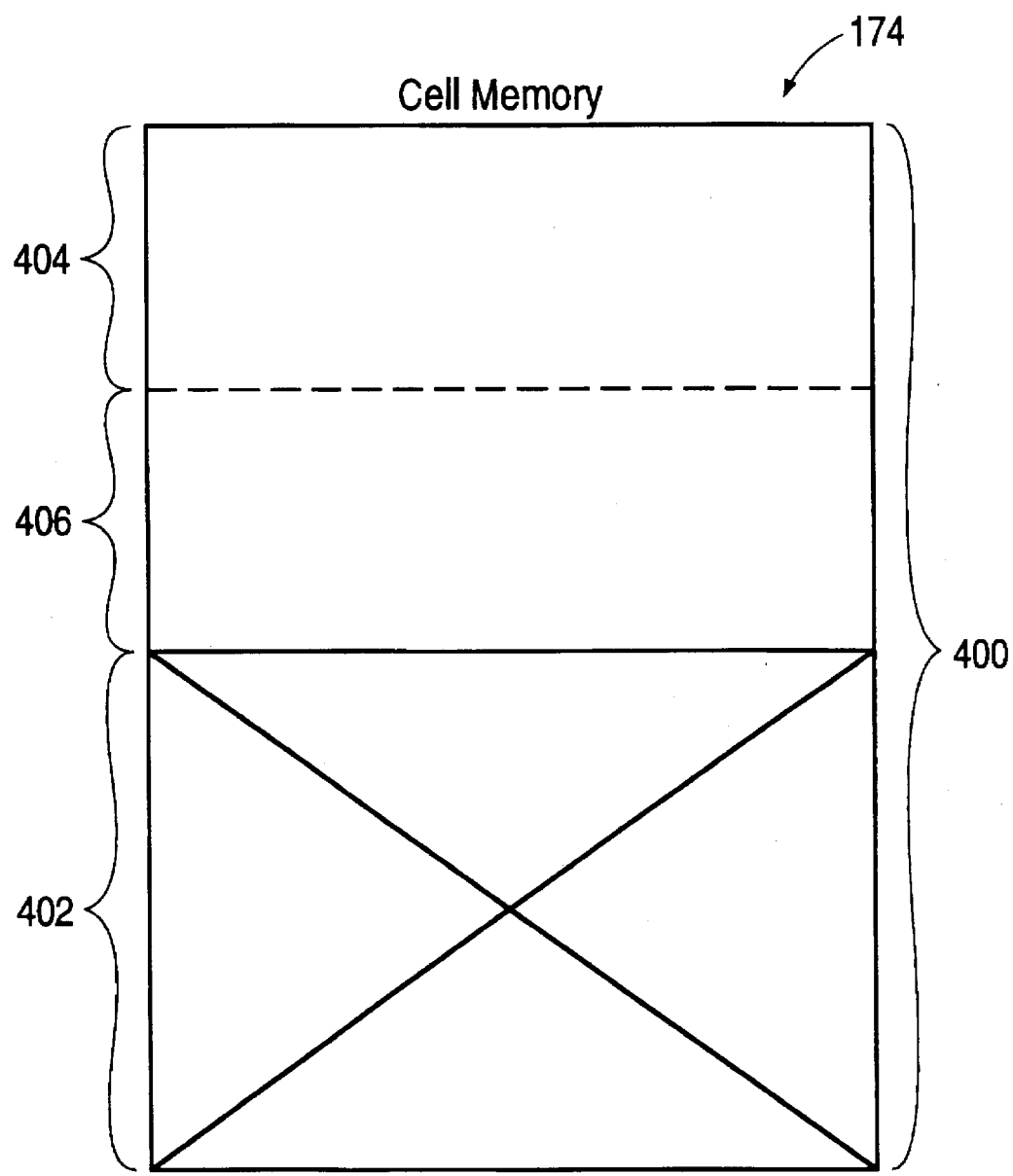
FIG. 13 is a schematic diagram showing a cell buffer memory with available space.
Figure 14:
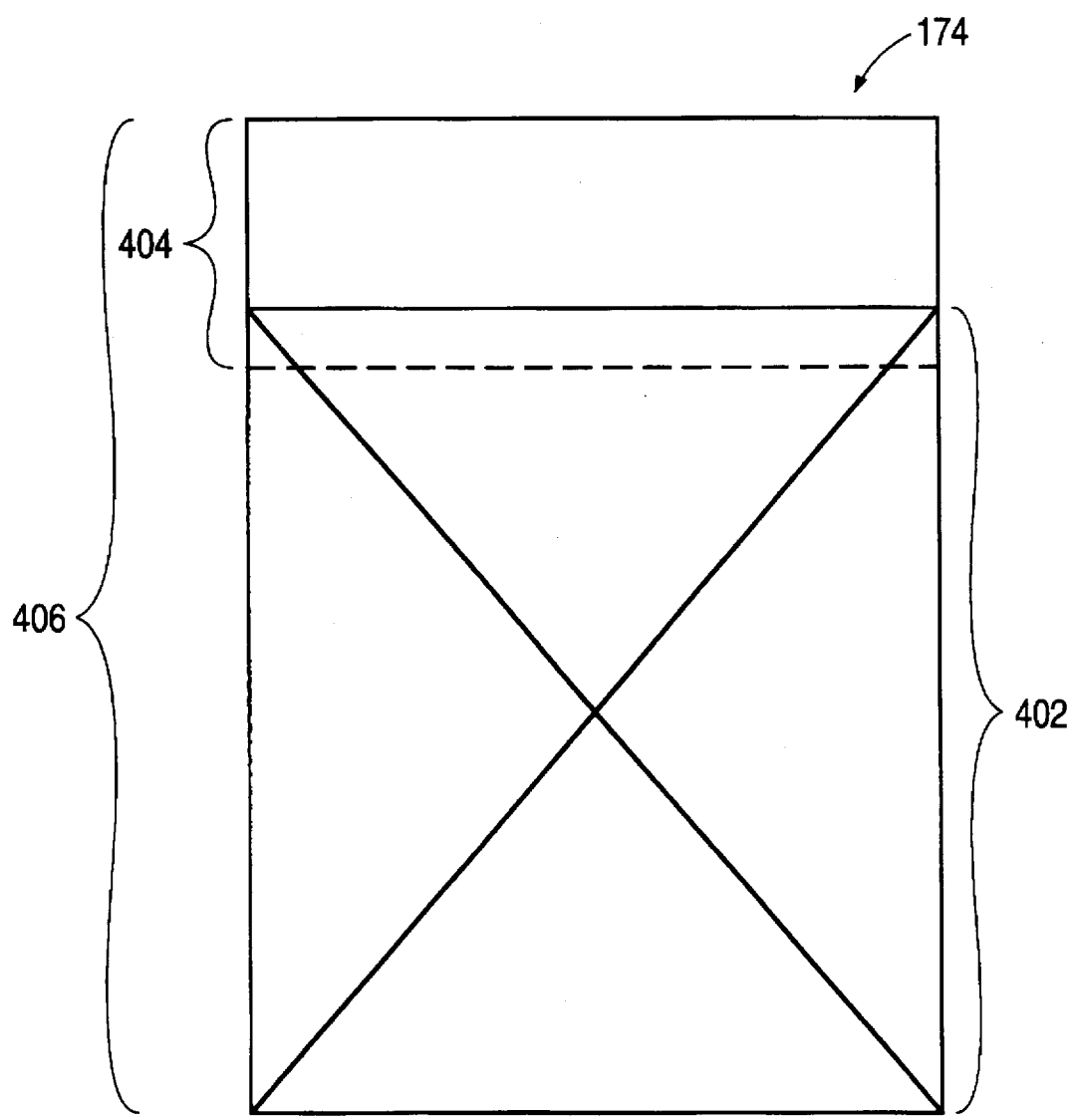
FIG. 14 is a schematic diagram showing a cell buffer memory with a potential overload condition.

FIGS. 13 and 14 are schematic diagrams of the cell buffer memory 174 in accordance with the invention in two different states, as described below. As described above, the minimum number of memory cells allocated to each output queue (MIN), the maximum number of memory cells allocated to each output queue (MAX) and the actual number of memory cells occupied by a particular output queue (COUNT) are variables that the memory manager keeps track of in order to allocate cell memory. In addition, with respect to the cell buffer memory itself, there are several variables for cell memory management, that may include a maximum size of the cell buffer memory (BUF_MAX) 400, an actual total number of memory cells currently occupied by all of the ATM cells (COUNT_TOT) 402, and an amount of memory reserved so that all of the MINs for all of the output queues can be satisfied regardless of the actual number of cells (WMARK) 404. WMARK is equal to the total of all of the MINs for all of the output queues.

As shown in FIG. 13, the cell buffer memory is in a first state of not being completely full. In other words, the cell buffer memory has additional memory space 406 where new incoming ATM cells may be stored. For the cell buffer memory to have extra space, BUF_MAX<WMARK+COUNT_TOT. As shown in FIG. 14, the cell buffer memory is in a second state of being full. In other words, BUF_MAX–COUNT_TOT<WMARK. Thus, there is not enough room within the cell buffer memory for the currently cells within the memory in addition to the memory space left to satisfy any minimums (WMARK). In a conventional ATM switch, the full buffer memory state causes the ATM switch to drop cells until the cell buffer memory is sufficiently empty.

Figure 15:
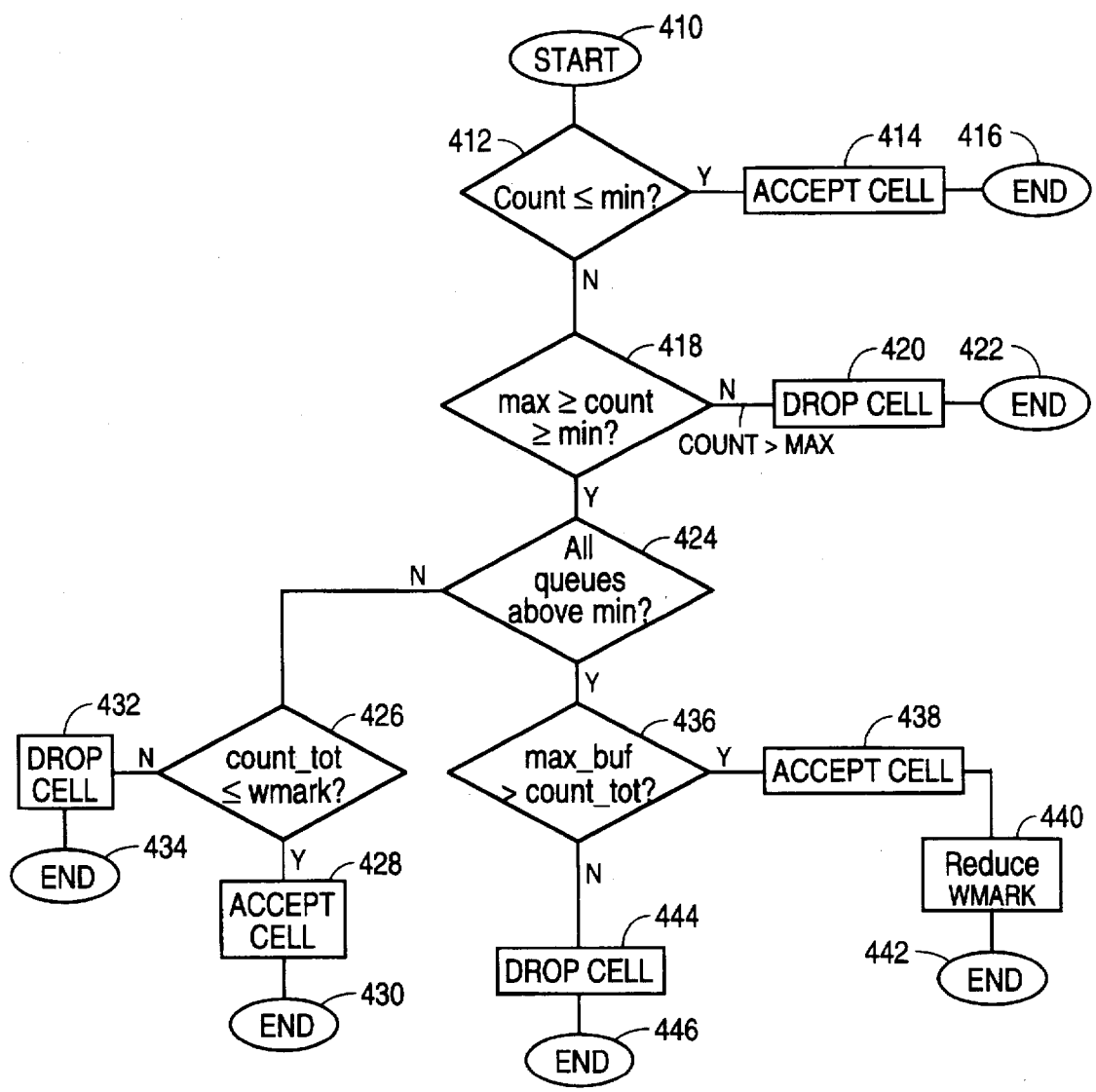
FIG. 15 is a flowchart showing a method of accepting or rejecting an ATM cell in accordance with the invention to prevent the overload condition shown in FIG. 14.

FIG. 15 is a flowchart of a cell acceptance method in accordance with the invention. The two memory states, shown in FIGS. 15 and 16, will be described in more detail below in connection with this cell acceptance method. In particular, the cell acceptance method of the invention handles the problem illustrated in FIG. 16 without dropping any cells. To understand this method better, a table showing variables corresponding to various ports and priority queues is shown. The variables may be stored in the memory manager.

| Port | Priority | MIN | MAX | COUNT |
|---|---|---|---|---|
| 1 | High Priority | 5 | 20 | 7 |
| 1 | Second Level Priority | 2 | 10 | 1 |
| 1 | Third Level Priority | 2 | 10 | 4 |
| 1 | Low Priority | 1 | 10 | 10 |
| 2 | High Priority | 5 | 20 | 4 |
| 2 | Second Level Priority | 2 | 10 | 0 |
| 2 | Third Level Priority | 2 | 10 | 1 |
| 2 | Low Priority | 1 | 10 | 3 |
| 16 | High Priority | 5 | 20 | 7 |
| 16 | Second Level Priority | 2 | 10 | 3 |
| 16 | Third Level Priority | 2 | 10 | 1 |
| 16 | Low Priority | 0 | 10 | 0 |

As shown in the table, each priority level sub-queue for each port has an assigned minimum number of cells allocated to it in the cell buffer memory (MIN), maximum number of cells (MAX), and an actual count (COUNT). Thus, the high priority output queue for Port 1 for example, has a MIN value of five cells, and a MAX value of 20 cells and currently has seven (7) cells. Similarly, the second level priority output sub-queue for Port 1 has a MIN value of two (2) cells and a MAX value of ten (10) cells and currently has one (1) cell. Thus, each priority level output sub-queue for each port has an assigned MIN and MAX, and has the actual number of cells within the sub-queue at any time stored.

This cell acceptance method may be carried out within the memory manager. The method of determining whether or not to accept a cell for a particular output queue and a particular priority level starts at step 410. Then, in step 412, the number of cells already within that port's priority output queue (COUNT) is compared to the minimum number of cells allocated to that port's priority queue (MIN) and it is determined whether or not the number of cells already within the output queue is less than or equal to the minimum allocated number of memory cells. If COUNT is less than or equal to MIN, then in step 414, the cell is accepted into the port's priority output queue. To accept the cell, the header and tail pointers for that particular port's priority output queue are updated and COUNT is increased by one. The method then ends in step 416. In step 418, it is determined whether COUNT for the particular port and particular priority is greater than MIN, but less than MAX. If COUNT is not less than MAX (i.e., the number of cells within the output queue is equal to the maximum number of cells allocated to that particular port and priority level), then in step 420, the cell is dropped and must be retransmitted later, and the method ends in step 422.

If the COUNT is between the MAX and the MIN values, then in step 424, it is determined whether or not all of the COUNTs of all of the output queues are above the MIN levels. If all of the actual number of cells in the output queues are not above the minimum number of cells allocated to the output queues, then in step 426, it is determined whether or not the total number of cells within the memory (COUNT_TOT) is less than or equal to the memory remaining after the minimum reserved memory to satisfy all output queue minimums (WMARK) is subtracted. WMARK is calculated by adding all of the MIN values for all of the priority sub-queues. If COUNT_TOT is less than or equal to WMARK, as shown in FIG. 14, then in step 428, the incoming cell is accepted and the method ends in step 430. If COUNT_TOT is greater than BUF_MAX–WMARK, then in step 432, the cell is dropped and the method ends in step 434.

Back in step 324, if all of the queues are not above the minimum levels, then in step 436, it is determined whether or not the maximum memory size (BUF_MAX) is greater than the total number of cells presently in the cell buffer memory (COUNT_TOT). If the size of the cell buffer memory is larger than the total number of cells currently in the cell buffer memory, then in step 438, the cell is accepted. In step 440, the total number of cells presently in the cells presently in the cell buffer memory is permitted to exceed temporarily the reserved memory space for the minimum allocations for each output queue since the minimums for every output queue has already been satisfied. When the number of cell within the cell buffer memory is reduced again, the reserved memory for the minimums is reestablished. In this manner, the reserved memory for all the MINs (WMARK) is dynamically variable so that the ATM switch in accordance with the invention handles temporary congestion within the cell buffer memory without dropping any cells.

In another embodiment of the cell acceptance method, WMARK may be variably calculated and based on the COUNT value for each output port and the MIN value for each priority sub-queue. Thus, the total of all of the MIN values (the old WMARK) is subtracted from the COUNT values for all of the priority sub-queues so that WMARK is as small as possible. In fact, if all of the MIN values for all of the priority sub-queues are satisfied, then WMARK is zero. Thus, WMARK dynamically varies with actual usage of the cell buffer memory so that maximum amount of memory space is available while still maintaining the MIN values for all of the priority sub-queues. For example, if there are no cells in the switch, then WMARK is a maximum value, but if ten cells are required to satisfy all of the MINs, then WMARK is equal to ten.

If the cell buffer memory size is not greater than the total number of cells within the cell buffer memory, then in step 444, the incoming cell is dropped and the method in ended in step 446. This particular method of determining whether or not to accept an incoming cell into the cell buffer memory permits the ATM switch of the invention to drop a minimum number of incoming cells by implementing a dynamically variable reserved memory for the allocated minimums for each output queue. The method only drops incoming cells when a true overload condition has occurred. In addition, in accordance with the present invention, the memory managers may also monitor the various variables in connection with the cell buffer memory in order to prevent an overflow condition from occurring.

While the foregoing has been with reference to a particular embodiment of the invention, it will be appreciated by those skilled in the art that changes in this embodiment may be made without departing from the principles and spirit of the invention, the scope of which is defined by the appended claims.

We claim:

1. A system for communicating multiple priority level data packets between an input port and one or more output ports of a switch, comprising:

means for receiving a data packet from the input port, the data packet having a header portion indicating an output port destination and a level of priority, selected from a predetermined set of priority levels, of the data within the data packet;

a buffer for storing the data packet in a selected buffer location, the buffer being shared by the output ports;

a plurality of queues corresponding to each of the output ports, each queue having a plurality of sub-queues for storing pointers to buffer locations containing data packets having different priority levels, selected from the predetermined set of priority levels; and means for storing a pointer to the selected buffer location in the priority sub-queues based on the output port destination and the selected priority level of the data packet.

2. The switch of claim 1, further comprising means for outputting the data packet to the output port, in an order based on the predetermined set of priority levels.

3. The switch of claim 1, further comprising means for outputting the data packets output ports, the data packets for each output port being output based on the predetermined set of priority levels.

4. The switch of claim 1, further comprising means for updating the pointers in the output queues when a data packet is received from an input port, and means for storing the plurality of priority sub-queues separately so that the plurality of sub-queues are updated simultaneously.

5. The switch of claim 4, wherein the updating means updates the pointers in each output queue when a data packet, indicating more than one output ports, is received.

6. The switch of claim 3, further comprising means for updating the output queues when a data packet is received and output by the switch, and means for storing the plurality of priority sub-queues so that the plurality of sub-queues are updated simultaneously.

7. The switch of claim 1, wherein each output queue for an output port stores the pointers to the buffer locations so that a first pointer within the output queue for a selected priority level is the first pointer output to the output port for that selected priority level.

8. The switch of claim 7, wherein each output port queue comprises a plurality of pointers linked together in a linked list.

9. The switch of claim 1, wherein the predetermined set of priority levels is four.

10. The switch of claim 1, further comprising means for determining whether to accept a data packet into the buffer based on predetermined congestion criteria.

11. A method for communicating multiple priority level data packets between an input port and one or more output ports of a switch, comprising:

receiving a data packet from the input port, the data packet having a header portion indicating an output port destination and a level of priority, selected from a predetermined set of priority levels, of the data within the data packet;

storing the data packet in a selected buffer location in a buffer, the buffer being shared by the output ports; and storing a pointer to the selected buffer location, in a plurality of queues corresponding to each of the plurality of output ports, each queue having a plurality of sub-queues for storing pointers to buffer locations containing data packets having a particular priority level, based on the output port destination and the selected priority level of the data packet.

12. The method of claim 11, further comprising outputting the data packet to the output port, in an order based on the predetermined set of priority levels.

13. The method of claim 11, further comprising outputting the data packets to output ports, the data packets for each output port being output based on the predetermined set of priority levels.

14. The method of claim 11, further comprising updating the pointers in the output queues when a data packet is received from an input port, and storing the plurality of priority sub-queues separately so that the plurality of sub-queues are updated simultaneously.

15. The method of claim 14, wherein updating comprises updating the pointers in each output queue when a data packet, indicating more than one output ports, is received.

16. The method of claim 13, further comprising updating the output queues when a data packet is received and output by the switch, and storing the plurality of priority sub-queues so that the plurality of sub-queues are updated simultaneously.

17. The method of claim 11, wherein each output queue for an output port stores the pointers to the buffer locations so that a first pointer within the output queue for a selected priority level is the first pointer output to the output port for that selected priority level.

18. The method of claim 17, wherein each output port queue comprises a plurality of pointers linked together in a linked list.

19. The method of claim 11, wherein the predetermined set of priority levels is four.

20. The method of claim 11, further comprising determining whether to accept a data packet into the buffer based on congestion criteria.

21. A method for communicating multiple priority level data packets between an input port and one or more output ports of a switch, comprising:
   receiving a data packet from the input port, the data packet having a header portion indicating a plurality of output port destinations and a level of priority, selected from a predetermined set of priority levels, of the data within the data packet;
   storing the data packet in a selected buffer location within a buffer;
   storing a pointer pointing to the selected buffer location in a plurality of queues corresponding to each of the plurality of output ports, each output port queue having a plurality of sub-queues for storing pointers to buffer locations containing data packets having a plurality of priority levels, wherein a pointer to the selected buffer location is stored in each particular priority sub-queue, corresponding to the priority level of the particular data packet, for each of the plurality of output port destinations; and
   reading the data packet out of the buffer memory in priority order, for each of the plurality of pointers, for each output port.

22. The method of claim 21, further comprising updating the pointers in the output queues when a data packet is received from an input port, and storing the plurality of priority sub-queues separately so that the plurality of sub-queues are updated simultaneously.

23. The method of claim 22, wherein updating comprises updating the pointers in each output queue when a data packet, indicating more than one output ports, is received.

24. The method of claim 21, further comprising updating the output queues when a data packet is received and output by the switch, and storing the plurality of priority sub-queues so that the plurality of sub-queues are updated simultaneously.

25. The method of claim 21, wherein each output queue for an output port stores the pointers to the buffer locations so that a first pointer within the output queue for a selected priority level is the first pointer output to the output port for that selected priority level.

26. The method of claim 25, wherein each output port queue comprises a plurality of pointers linked together in a linked list.

27. The method of claim 21, wherein the predetermined set of priority levels is four.

28. The method of claim 21, further comprising determining whether to accept a data packet into the buffer based on congestion criteria.

29. A method for communicating multiple priority level data packets between an input port and one or more output ports of a switch, comprising:
   receiving a data packet from the input port, the data packet having a header portion indicating an output port destinations and a level of priority, selected from a predetermined set of priority levels, of the data within the data packet;
   managing a buffer, the buffer having buffer locations for storing a data packet, with a plurality of queues corresponding to each of the plurality of output ports, each queue having a plurality of sub-queues for storing pointers to buffer locations containing data packets having a particular priority level;
   determining if the number of data packets within each of the plurality of priority sub-queues is greater than a minimum value;
   comparing a maximum buffer space value of the buffer to a total number of data packets within the buffer; and
   storing the data packet in a particular priority sub-queue for a particular output port, comprising accepting the data packet into the buffer, and temporarily decreasing the free space available in the buffer.

30. The method of claim 29, wherein determining if the number of data packets, comprises determining a total number of data packets within each priority sub-queue, adding the total number of data packets for each priority sub-queue together to produce a total value, determining a reserved buffer space value corresponding to a number of buffer locations needed to satisfy the minimums for all of said priority sub-queues, comparing said total value to said reserved buffer space value to produce a buffer quota value for satisfying the minimum value of all of the priority sub-queues, and reducing the free space available in said buffer by said buffer quota.

31. The method of claim 30, further comprising comparing a number of data packets within each priority sub-queue to a minimum and maximum value to determine whether to accept a data packet into the buffer.

32. The method of claim 21, wherein comparing the number of data packets comprises accepting the data packet if the number of data packets within priority sub-queue is below the minimum value, and dropping the data packet if the number of data packets with the priority sub-queue is above the maximum value.

* * * * *